United States Patent [19]

Nakamura et al.

[11] Patent Number: 5,414,843
[45] Date of Patent: May 9, 1995

[54] METHOD AND SYSTEM FOR GENERATING A PROJECT SCHEDULE USING WEIGHTED WORK PROCESSES

[75] Inventors: Akihiro Nakamura, Yokohama; Takeshi Imanishi, Kawasaki, both of Japan

[73] Assignees: Hitachi, Ltd.; Hitachi System Engineering Ltd., both of Tokyo, Japan

[21] Appl. No.: 289,441

[22] Filed: Aug. 11, 1994

Related U.S. Application Data

[63] Continuation of Ser. No. 797,026, Nov. 25, 1991, abandoned.

Foreign Application Priority Data

Nov. 28, 1990 [JP] Japan .................. 2-326498

[51] Int. Cl.6 .................................. G06F 15/21
[52] U.S. Cl. .................... 395/600; 395/650; 364/DIG. 1
[58] Field of Search ............. 395/600, 650; 364/401

[56] References Cited

U.S. PATENT DOCUMENTS

| | | | |
|---|---|---|---|
| 4,019,027 | 4/1977 | Kelley | 235/89 |
| 4,847,761 | 7/1989 | Ferriter et al. | 364/401 |
| 4,875,162 | 10/1989 | Ferriter et al. | 364/401 |
| 4,887,218 | 12/1989 | Natarajan | 364/468 |
| 5,099,431 | 3/1992 | Natarajan | 364/468 |
| 5,101,340 | 3/1992 | Nonaka et al. | 395/650 |
| 5,109,337 | 4/1992 | Ferriter et al. | 364/900 |
| 5,220,540 | 6/1993 | Nishida et al. | 368/41 |

FOREIGN PATENT DOCUMENTS

| | | | |
|---|---|---|---|
| 642165 | 1/1989 | Japan | G06F 15/21 |
| 6417150 | 1/1989 | Japan | G06F 15/21 |
| 2310703 | 12/1990 | Japan | G05B 13/02 |

*Primary Examiner*—Thomas G. Black
*Assistant Examiner*—Peter Y. Wang
*Attorney, Agent, or Firm*—Antonelli, Terry, Stout & Kraus

[57] ABSTRACT

A schedule table production system includes a product table file in which a table of product names to be produced is stored, a work procedure file including a work table in which each work process with a weight added thereto is stored, a relational table in which sequence of processes is stored, a schedule file including a process table in which a start date and an end date of each work process are established, and a relational table in which a sequence of processes is stored. The system includes a schedule editing processor for calculating and editing a schedule of each work process from start and end dates of the whole work process on the basis of the weight of each work process, to automatically produce a schedule table used for producing the product.

7 Claims, 7 Drawing Sheets

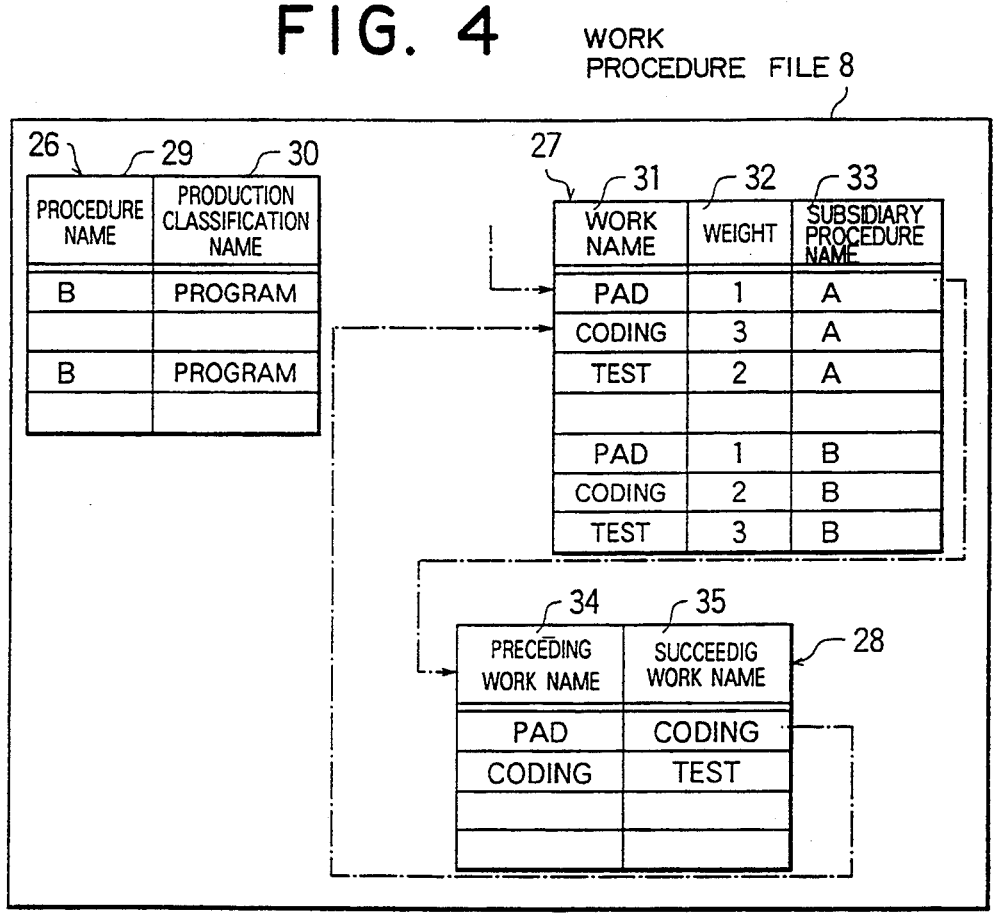

| PRODUCT CLASSIFICATION | | 60 |
|---|---|---|
| 1 | PRODUCT CLASSIFICATION 1 | |
| 2 | PRODUCT CLASSIFICATION 2 | |
| 3 | PRODUCT CLASSIFICATION 3 | |
| 4 | PRODUCT CLASSIFICATION 4 | |
| 5 | PRODUCT CLASSIFICATION 5 | |

METHOD AND SYSTEM FOR GENERATING A PROJECT SCHEDULE USING WEIGHTED WORK PROCESSES

This application is a continuation of application Ser. No. 07/797,026, filed on Nov. 25, 1991, now abandoned.

BACKGROUND OF THE INVENTION

The present invention relates to a schedule table production method and system, particularly in a project control support system operating on an electronic computer system, for automatically producing a production schedule when performing a project according to a work procedure of the project and a list of products or work services (herein referred to as "products" for simplification) to be produced in order to control the progress of the project.

In a conventional project control support system, generally, a procedure to produce a production schedule at the time of performing a project has been performed in the following approach. First, names of products of the project are input, and next regarding respective products, schedules for respective processes are established sequentially along production procedures of respective predetermined work processes to thereby produce a production schedule for the project. In such a manner, a production schedule for a project is produced mainly by a so-called manual operation.

In a conventional method for producing a production schedule for project schedule control, since a production schedule for a project is produced mainly by manual operation, there has been a problem that it is troublesome to produce a new production schedule and produce it rapidly.

JP-A-64-17150 discloses a project execution schedule production processor, in which, when a project, for example for producing a program for a data processor, is executed, the quantity and complexity of each task in each section of a work group divided into one or more work sections are manually input, the total number of required days for completing the tasks calculated, and the start day and end day of each work task are determined to thereby generate a schedule for executing the work group. In this processor, however, it is necessary for an operator to enter information parameters required for determining a schedule, such as the quantity and complexity of each work task whenever a work schedule is produced.

JP-A-02-310703 discloses a computer support process managing device, in which an order having no margin of error is extracted on the basis of an order delivery date and work time, and work instructions are automatically generated with priority to thereby support the progress of the succeeding process. However, such device teaches no measures for promptly providing a schedule for executing a project.

SUMMARY OF THE INVENTION

It is therefore a general object of the present invention to solve the foregoing problems in the prior art.

It is an object of the present invention to provide a schedule table production method and system for automatically producing a production schedule for a project from a work procedure and a product table by the support of a computer system.

In order to attain the foregoing objects, according to one aspect of the present invention, a schedule table production system comprises: a product table file in which a table of product names to be produced is registered; a work procedure file including a work table in which each work process obtained by adding a weight thereto is registered, and a first relational table in which a sequence of processes is registered; a schedule file including a process table in which a start date and an end date of each work process are established, and a second relational table in which a sequence of processes is registered; and schedule edition processor means for calculating and editing a schedule of each work process from the start and end dates of the whole work process for a product to be produced which are input by an input means, on the basis of the weight of each work process with reference to the work procedure file and the product table file.

According to another aspect of the present invention, the schedule table production system further comprises a product classification file including a product table in which classification for each product is registered, and the schedule edition processor means promptly determines whether a work procedure corresponding to a product classification required by an operator is present in the work procedure file or not.

Thus, the schedule table production system having the above configuration is provided with the product table file, the work procedure file, the product classification file, the schedule file, and the schedule edition processor means.

The product table file is a file in which products to be produced are registered, and the work procedure file represents a file including a work table in which weight data is added to each work process, the work table being provided together with a relational table indicating the sequence of each work process. In the product classification file, the classification of products corresponding to product names is registered. The automatically produced schedule file is a file including a process table having start and end dates of each work process, the process table being registered together with a relational table indicating the sequence of each work process. The schedule edition processor means obtains the whole period, from the start and end dates, of the whole work process in response to the designation of a product name of the product table file and the designation of the start and end dates of the whole work process, and calculates a schedule for each work process on the basis of the weight for each work process along the sequence of the relational table of the work procedure file. Further, the schedule edition processor means edits the calculated schedule of each work process and produces a schedule of a user's desired form.

In addition, especially, if a product name to be produced is designated from the product table of the product table file and the start and end dates of the whole work process for the designated product are designated, the period of the start and end dates of the whole work process is shared on the basis of the weight (data) of each work process registered in the work procedure file along the sequence of work processes in the relational table, and start and end dates of each particular work process are calculated. The start and end dates of each work process are set in the process table in the schedule file for every process. With reference to the relational table showing the sequence of each work process in the work procedure file, the work sequence of each work process is determined to produce a series of schedules and, for example, a schedule edited into a table form.

As has been described, if designation is made of what is to be produced in a product table, of a work procedure indicating how to produce the product, and of a period of the start and end dates of work, a prototype or original model of a schedule is automatically produced. If a user adjusts the automatically produced schedule, it is still possible to obtain a complete schedule. As a result, it is possible to avoid extraneous input and, therefore, schedule production is facilitated.

BRIEF DESCRIPTION OF THE DRAWINGS

FIG. 4 is a diagram illustrating an example of a file structure of a work procedure file;

FIG. 5 is a diagram illustrating an example of a file structure of a product table file;

DETAILED DESCRIPTION OF THE PREFERRED EMBODIMENT

An embodiment of the present invention will be described hereunder with reference to the drawings.

Figure 1:
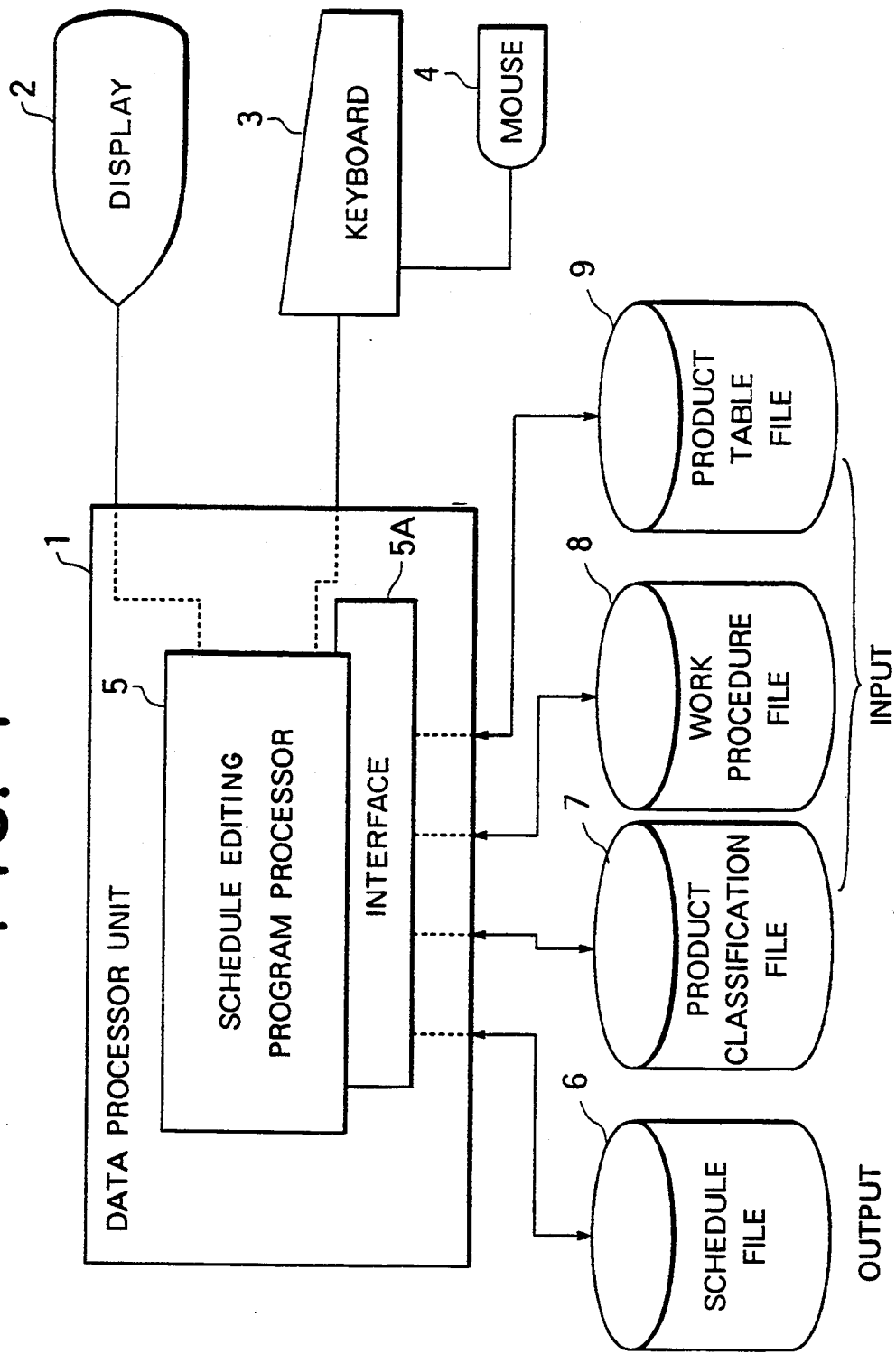
FIG. 1 is a block diagram illustrating the configuration of a schedule table production system according to an embodiment of the present invention.

FIG. 1 diagrammatically illustrates the configuration of a schedule table production system according to an embodiment of the present invention. In FIG. 1, a reference numeral 1 represents a data processor (body), 2 represents a display means, such as a graphic display, a CRT, an LCD or the like, 3 represents a keyboard, 4 represents a pointing device, such as a mouse, 5 represents a schedule editing program processing portion including a file interface portion 5A, 6 represents a schedule file, 7 represents a product classification file, 8 represents a work procedure file, and 9 represents a product table file.

Figure 2:
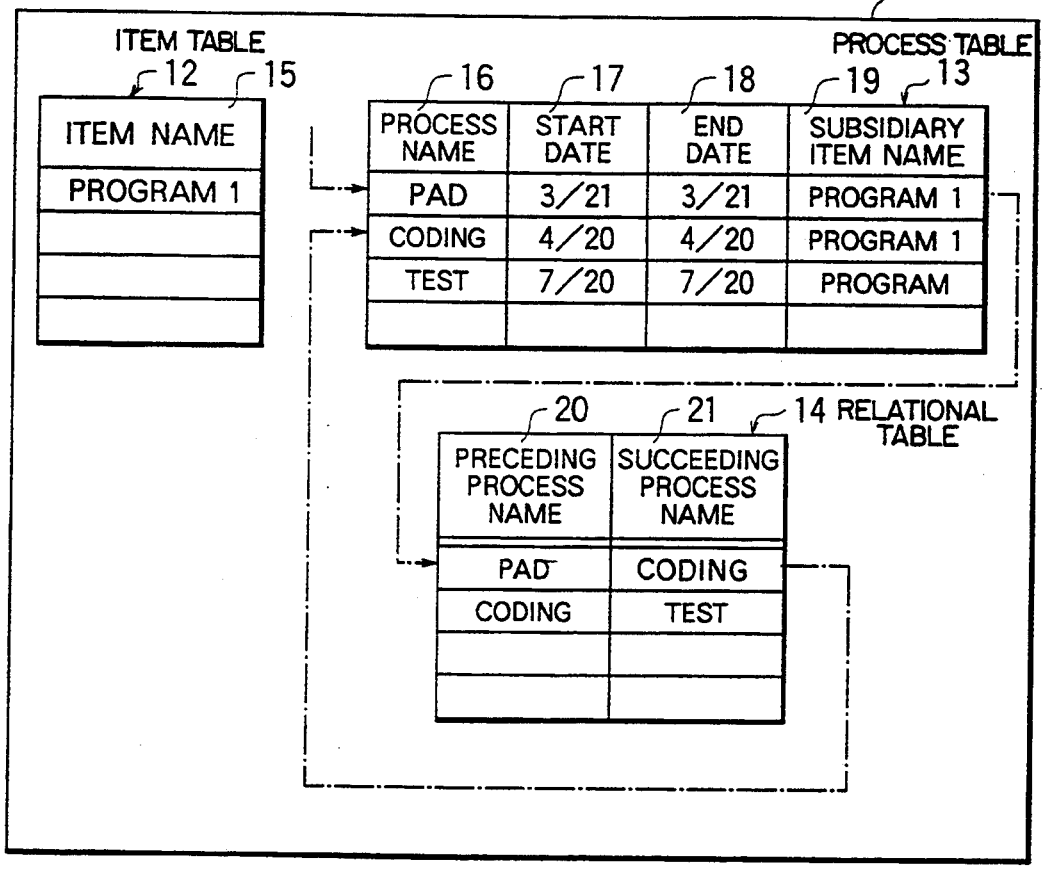
FIG. 2 is a diagram illustrating an example of a file structure of a schedule file.

FIG. 2 shows an example of the file structure of the schedule file 6. As shown in FIG. 2, the schedule file 6 is constituted by an item table 12, a process table 13, and a relational table 14. The item table 12 has an item name field 15. The process table 13 has respective fields of a process name 16, a start date 17, an end date 18 and a subsidiary item name 19. In the process name field 16, names of respective work processes are stored, and in the respective start date field 17 and the end date field 18, individual start and end dates of the respective work processes are set, respectively. These individual start and end dates of the respective work processes are calculated, obtained and established by a series of computer system processings which will be described later. In subsidiary item name field 19, item names to which the respective processes belong are stored. The item names stored here are coincident with the item names stored in the item name field 15. In addition, the relational table 14 is constituted by a preceding process name field 20 and a succeeding process name field 21, showing the context of two work processes. Tracing each work process stored in the fields of the relational table 14 enables the sequence of each work process to be determined.

Figure 3:
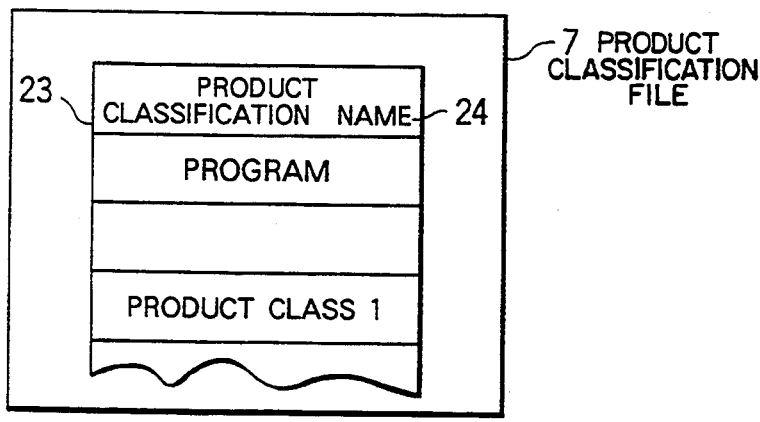
FIG. 3 is a diagram illustrating an example of a file structure of a product classification file.

FIG. 3 diagrammatically illustrates an example of the file structure of the product classification file 7. The product classification file 7 is constituted by a product classification table 23 for managing the classification of products to be produced. The product classification table 23 has a field of a product classification name 24.

FIG. 4 shows an example of the file structure of the work procedure file 8. The work procedure file 8 is constituted by a procedure table 26, a work table 27, and a relational table 28, for managing the work procedure to produce products using the respective tables. The procedure table 26 has a procedure name field 29 and a production classification name field 30. Procedure names of work procedures are set in the procedure name field 29, and product classification names corresponding to the procedure names are set in the production classification name field 30. The work table 27 has a work name field 31, a weight field 32, and a subsidiary procedure name field 33. In the work name field 31, work names of respective work processes are set. In the weight field 32, weights of work processes of the work names are set. Data of weight here expresses the ratio of time required for achieving a work at a corresponding process within the whole work process. The data of weight is set by use of a customized data base. A procedure name set in the subsidiary procedure name field 33 expresses a procedure to which the process of a corresponding work belongs. The relational table 28 is constituted by a preceding work name field 34 and a succeeding work name 35, for expressing the context of two work procedures. Tracing each procedure name stored in the fields of this relational table 28 enables sequence the sequentiality of each work procedure to be ascertained.

FIG. 5 shows an example of the file structure of the product table file 9. The product table file 9 is constituted by a product table 37. The product table 37 has a product classification name field 38 and a product name field 39, for managing the names of respective products correspondingly to the classification of the products.

Figure 6:
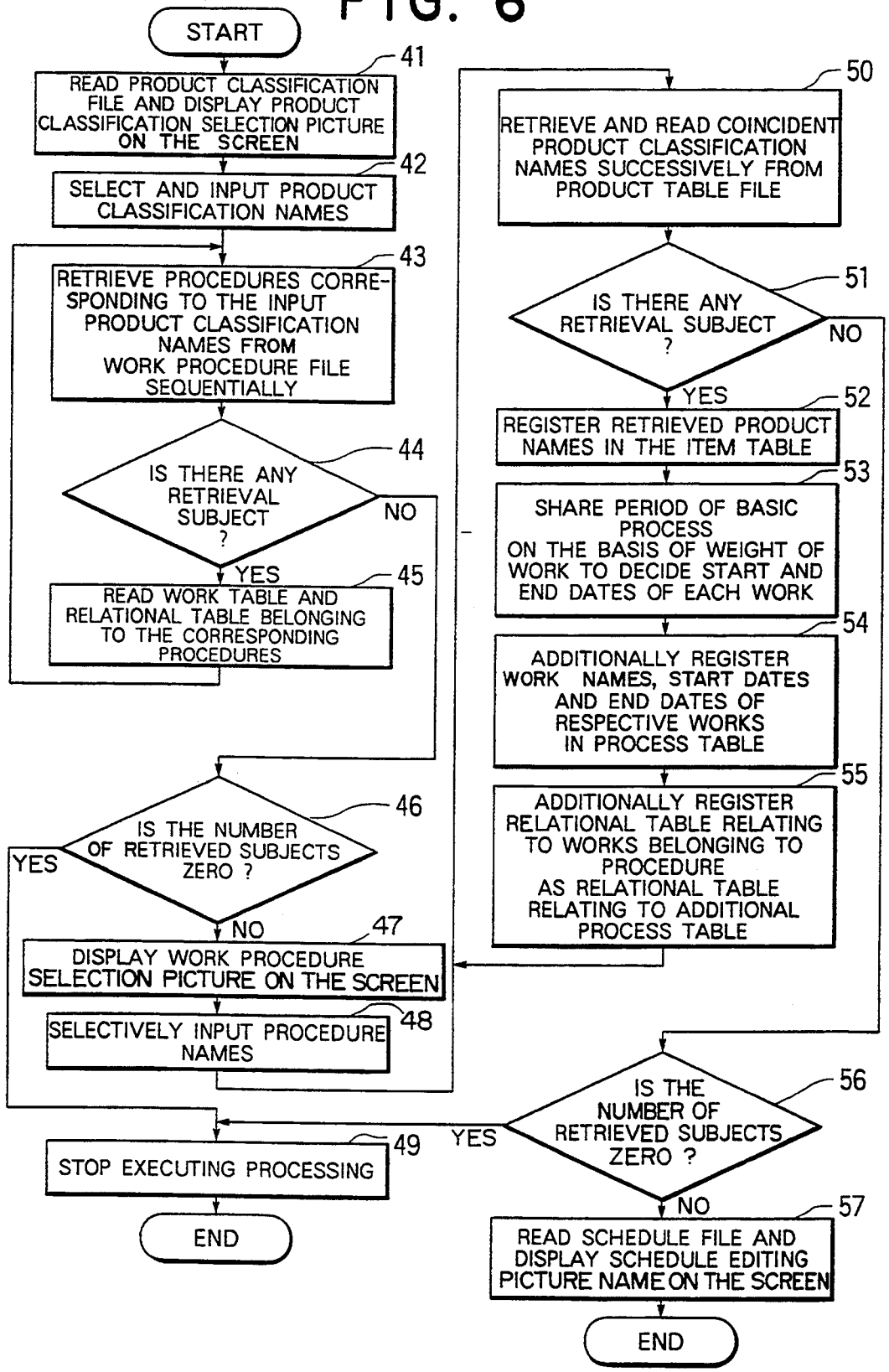
FIG. 6 is a flow chart illustrating a processing flow of a schedule production processing performed in a schedule editing program processor portion.

FIG. 6 is a flow chart illustrating a processing flow of a schedule production processing performed in a schedule editing program processing portion.

In the schedule production processing, a schedule is produced by use of the product classification file 7, the work procedure file 8, and the product table file 9, and each table data to be stored in a schedule file is produced.

First, after starting the processing, in step 41, a product classification file is read out, and a product classification selection picture (diagram) is displayed in a display means. Next, in step 42, product classification names to be produced are selected and input through the displayed product classification selection picture. In step 43, procedures corresponding to the input product classification names are retrieved from a work procedure file sequentially. In a step 44, judgment is made as to whether a retrieval subject is present which has been retrieved yet or not. If a retrieval subject is present, proceeding to step 45, a work table and a relational table belonging to the corresponding procedures are read out from the work procedure file. Returning to step 43, procedures corresponding to the input product classification names are retrieved from the work procedure file successively again. Next, in step 44, judgment is made as to whether a retrieval subject is present or not, and the processing is repeated until no retrieval subject is found.

On the other hand, if it is found in step 44 that there is no retrieval subject which has not yet been retrieved, the processing advances to step 46 and judgment is made there as to whether or not the number of retrieved subjects is zero. If the number of retrieved subjects is zero, it is determined that an error exists in the retrieval processing, and therefore, proceeding to step 49, the executing processing is stopped to perform another error processing. On the other hand, if it is determined in step 46 that the number of retrieved subjects is not zero, it expresses that the input of a work procedure file has finished, so that the processing advances to step 47 to perform a next processing.

In step 47, a work procedure selection diagram (guidance) is displayed on the display screen, and in step 48 procedure names are selectively input or designated by an operator. Next in step 50, with reference to a product table file, corresponding product classification names are retrieved successively, and processing to read them out to a computer system is performed. In step 51, judgment is made as to whether there is a retrieval subject which has not been retrieved yet or not. If any retrieval subject is present, the processing advances to step 52 and retrieved product names are registered in the item name 15. Next in step 53, a period of a basic process is shared on the basis of the data of weight of a work in the work table which has already been read out so that start and end dates of each work process are calculated and determined. In step 54, work names, start dates and end dates of respective works are registered in the process table. In step 55, a relational table relating to works belonging to the selected procedure is registered as a relational table relating to the registered process table. Next the processing from the step 50 is again performed, wherein retrieval is performed on products corresponding to a next product classification name, and similar processings are performed sequentially.

On the other hand, in step 51, if there is no retrieval subject to be performed next, the processing advances to step 56 and judgment is made there as to whether or not the number of retrieved subjects is zero. If the number of retrieved subjects is zero, it is determined that an error exists in the retrieval processing, so that proceeding to step 49, the executing processing is stopped to perform another error processing. On the other hand, if it is determined in step 56 that the number of retrieved subjects is not zero, the determination means that the production processing of a designated schedule has finished. Accordingly, proceeding to the step 57, in order to store the schedule of the start and end dates of each process set in the process table and edit the schedule, the schedule file is read out and a schedule editing picture scene is displayed to complete a series of processings.

Next, in the case where such an operation relating to a schedule production processing is performed in a schedule edition program processing portion, examples of respective display pictures displayed from a system will be described with reference to FIGS. 7 and 8.

Figures 7, 8:
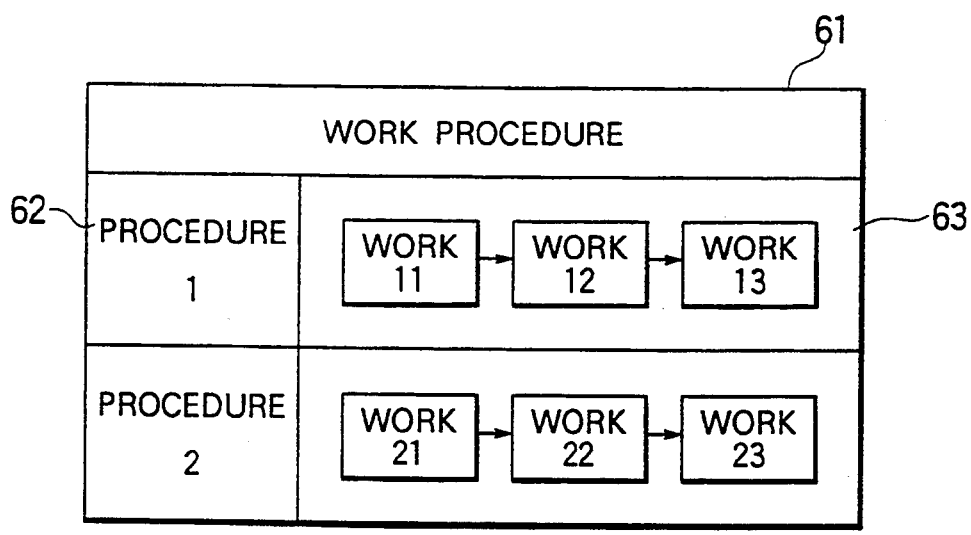
FIG. 7 is a diagram illustrating an example of a product classification display picture on the screen.
FIG. 8 is a diagram illustrating an example of a work procedure display screen.

FIG. 7 diagrammatically illustrates an example of a product classification display picture screen. This product classification display picture screen 60 is displayed when a request of selective input of product classification is issued from a computer system side. That is, the product classification file 7 is read out, and the product classification name 24 registered in the product classification table 23 is displayed in a list form in this product classification display (picture screen) 60 of the display means 2, then waiting for a selection instruction. A user designates a point on the picture screen interactively by use of the mouse 4, so that it is possible to select and enter one of product classifications. Thus, a product classification name can be input while preventing an input mistake.

FIG. 8 shows an example of a production procedure display picture screen displayed on the display means 2. To the production procedure display picture screen 61, each data is put from the work procedure file 8, and procedure names are displayed in a left side 62 of the picture screen. In a right side 63 of the picture screen, respective work names belonging to respective procedures specified by the procedure names are displayed sequentially. These work names are displayed by reading out a preceding work name and a succeeding work name from the relational table 28 relating sequentiality to respective work procedures, judging the sequentiality of works, reading the works sequentially, and combining corresponding works through a line. A user designates a point on the picture screen by use of the mouse 4, so that it is possible to select one of the procedures. It is therefore possible to confirm work procedures, and perform an entry to designate a work procedure without an entry mistake.

Figure 9:
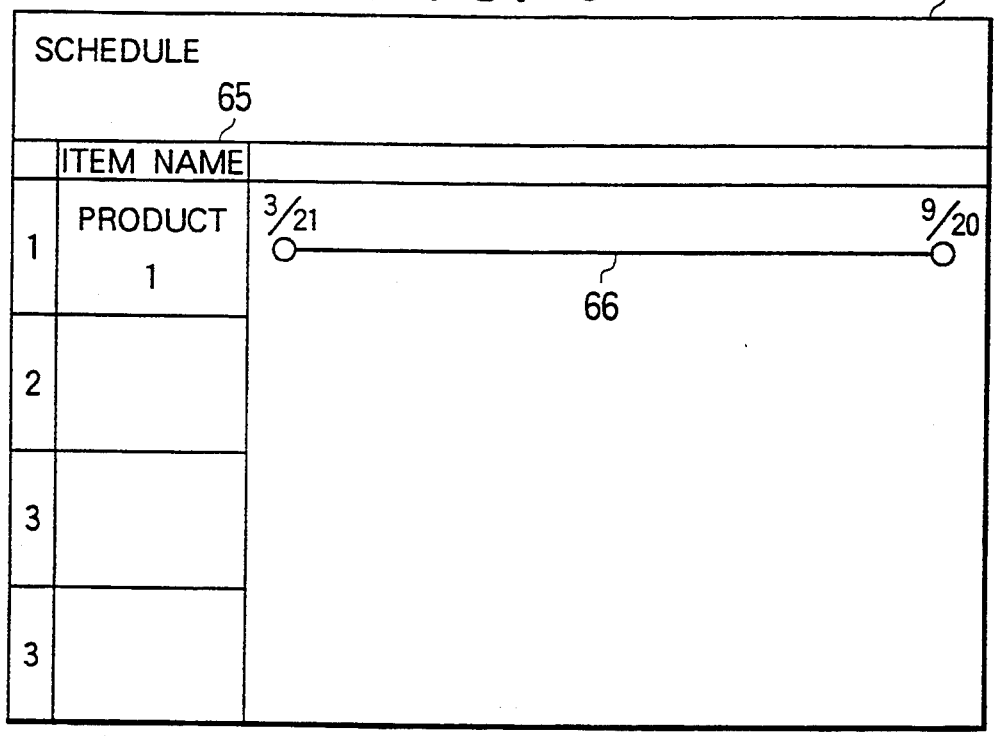
FIG. 9 is a diagram illustrating an example of a schedule editing screen.

FIG. 9 shows an example of a schedule editing picture screen. A schedule editing picture screen 64 is produced by inputting each table data from the schedule file 6. In the schedule editing picture screen 64, an item name 65 is displayed along the ordinate, and a time axis or time base 66, the ends of which are the minimum of start dates and the maximum values of end dates in the whole work process is displayed along the abscissa. When schedule editing is performed, individual small units of work processes are displayed by their subsidiary item name, and start and end dates of the work processes are displayed at corresponding positions of the time axis 66. A user can edit a schedule by use of the mouse 4 and/or the keyboard 3, thereby adding, erasing or changing items and processes of respective work processes. The designation of an item or a process to be a modification/editing subject or the entry of a start date or end date is performed by designating one point on the picture screen with the mouse 4. Each data of a schedule as a result of the modification/editing is put into the schedule file at the time of finishing the modification/editing processing.

Next, description will be made of an example of an operation processing for producing a schedule by use of the product classification file 7, the work procedure file 8 and the product table file 9 as described above, and of editing the produced schedule.

An initial picture screen for the schedule edition picture screen immediately before a schedule editing processing is displayed as shown in FIG. 9. The period between start and end dates of the whole work process displayed on the time base 66 is a process period meaning a period to be basic to produce a schedule, and will be called "basic process period" hereinafter.

First the schedule editing picture (diagram) 64 as shown in FIG. 9 is displayed on the screen, and a user designates therein a time base of a basic process period by the mouse 4 and displays the same on the picture screen. If the user inputs an automatic production command, the product classification file 7 is read into a processing means, and the product classification display picture 60 (FIG. 7) is displayed on the display means 2 (the step 41 in FIG. 6). If the user designates one of items in the list on the picture screen with the mouse 4, a selected product classification is judged from the values of the coordinates (the step 42). For example, assume that a product classification 1 is selected. From the procedure table 26 of the work procedure file 8, the program processing portion 5 retrieves and enters a procedure, the product classification name of which is the product classification 1. If the procedure is found by the retrieval, the program processing portion 5 inputs the work table 27 and the relational table 28 belonging to the procedure having the product classification 1 (the step 45).

Figure 10:
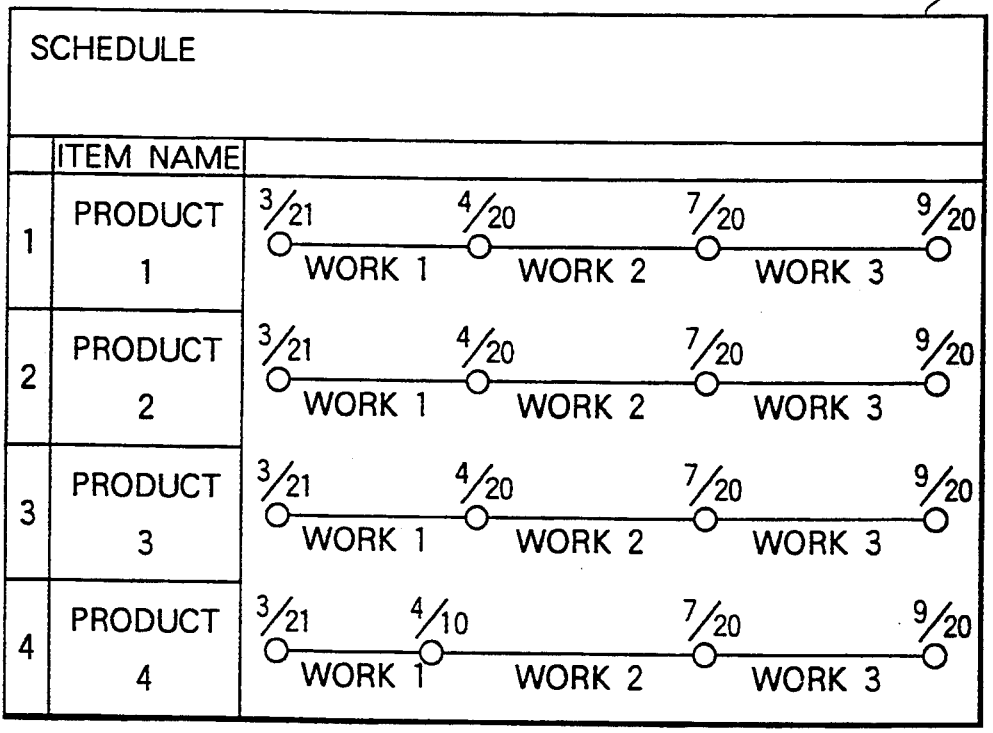
FIG. 10 is a diagram illustrating an example of a schedule editing display screen as a result of producing a schedule.

When the entry of the work procedure file 8 ends, the production procedure display picture 61 (FIG. 8) is displayed, so that the user selects and designates one of work procedures (the steps 47 and 48). For example, assume that a procedure 1 is selected. One product the product, classification name of which is the product classification 1, is retrieved and read out from the product table file 9, and registered to the item table 12 making its product name "product 1" (the step 52). Weight data of each work process belonging to the procedure 1 designated in the production procedure display picture 61 is read in, the basic process period is shared by the weight data, and an operation processing to determine start and end dates of each work process is performed (the step 53). Work names, start dates, end dates and product names associated with the respective work processes are added to the process table 13 (the step 54). Further, a relational table associated with the work processes belonging to the procedure 1 is added as a relational table associated with the added process table 13 (the step 55). Such processing is repeated until no subject to be retrieved is found in the product table file. As a result of this processing, the production processing of schedules concerning products 1 to 4 is performed and, for example a schedule editing picture 67 as shown in FIG. 10 is displayed on the screen. In this schedule edition picture 67, schedules concerning the products 1 to 4 are automatically produced from data registered in respective files of the system sequentially, and become a schedule to which dates of respective schedules of individual works 1 to 3 of small units of work processes on the respective products are added automatically. Data of such a schedule displayed in the schedule editing picture screen 67 are stored in the schedule file 6 so that the data are read out from the schedule file 6 so as to be used at the time of performing an editing processing of the schedule at a later time.

Figure 11:
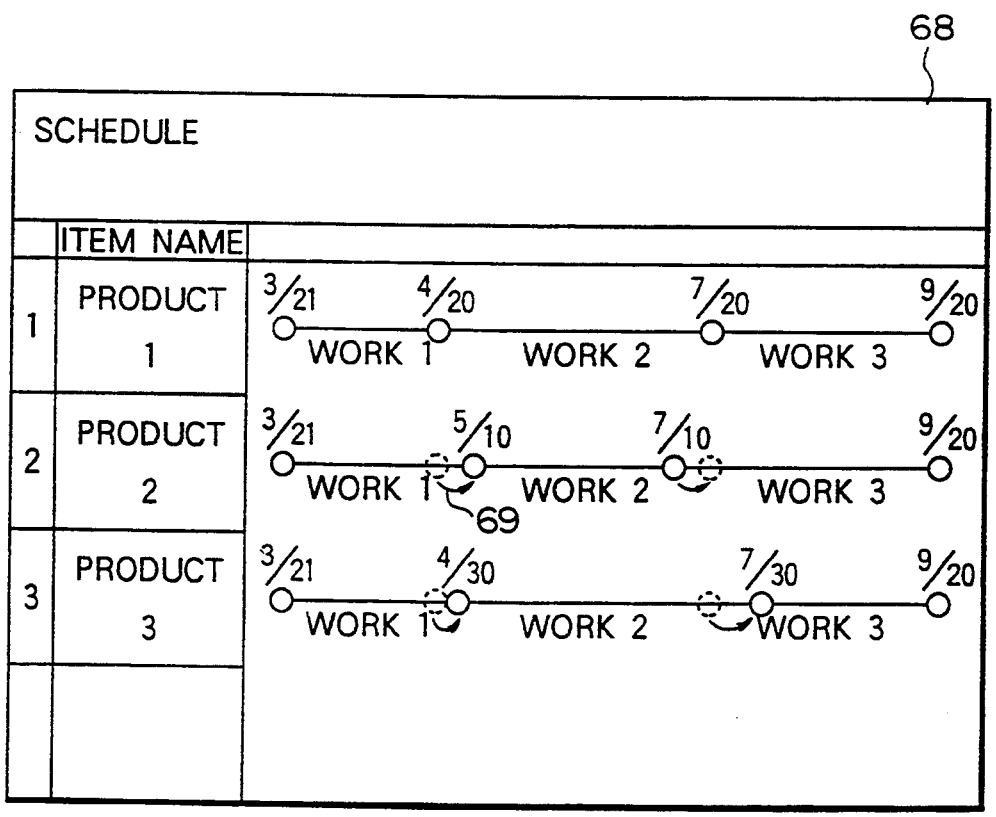
FIG. 11 is a diagram illustrating an example of a schedule editing display screen in the case of performing a schedule editing processing.

FIG. 11 shows an example of a schedule editing picture screen in the case of performing a schedule editing processing. A schedule edition picture 68 here shows an example of a picture screen in the case of performing modification suitable to individual work schedules on the basis of a schedule made up as the schedule editing picture 67 shown in FIG. 10. This editing processing is performed by designating data of each work process displayed on the picture screen with the mouse 4 interactively and inputting modified data.

In this schedule edition picture screen 68, small units of individual work processes are displayed by subsidiary item names, and start and end dates of the work processes are displayed at corresponding positions on the basis of time. By this schedule edition picture 68, a user performs editing of a schedule with the mouse 4 and/or the keyboard 3, thereby adding, erasing and/or changing items and processes of the respective work processes. For example, in the case of changing the end date of the work 1 of the process 2 from 'April 20' to 'May 10', 'April 20' of the end date of the work 1 is picked with the mouse 4, and 'May 10' is input through the keyboard 3, so that as shown in FIG. 11, the end date of the work 1 of the product 2 is changed to 'May 10', a point 69 on the time base is moved and displayed, and a schedule as a result of the modification is displayed on the picture screen. Each data of the schedule as a result of the editing is input and stored into the schedule file again when the editing processing is finished.

Although the present invention has been described here along one embodiment, the present invention is not to be limited to the present embodiment, and includes various modifications within the scope and spirit of the present invention. It should be understood that products in the present invention include intellectual products, such as programs or labor service, such as construction works or distribution works. In addition, proportional division of a schedule may be made up by dividing the schedule into hierarchically rough steps.

As has been described, according to a schedule table production system along the embodiment of the present invention, when a new schedule is produced, it goes well only if modification is performed after automatic production, so that it is possible to perform the production of a schedule easily. Particularly since a product table is often made up for another object, by use of the table as a database, it is possible to perform the production of a schedule easily. In addition, since a schedule is produced on the basis of a work procedure file, standardized work procedures can be achieved.

What is claimed is:
1. A schedule table producing system comprising:
a product table file for storing a table which includes product names to be produced;
a work procedure file for storing a work table which includes work processes associated with a product, and a first process sequence table which indicates a sequence in which said work processes are executed, each of said work processes being attached with a weight which represents a ratio of time required for completing the work process and time required for completing a whole sequence of said work processes associated with the product;
a schedule file for storing a process table which includes a start date and an end date of a whole sequence of work processes, and a second process sequence table which indicates another sequence in which said work processes are executed; and
schedule editing processing means coupled to said product table file, said work procedure file and said schedule file, for calculating and editing a schedule of each work process from the start and end dates of the whole sequence of work processes for the product to be produced on the basis of the weight of each work process with reference to said tables of said work procedure file and said product table file to collectively produce a schedule of the se- quence of work processes, and storing said edited schedule into said schedule file.

2. A schedule table producing system according to claim 1, further comprising a product classification file for storing a product table having a classification for each product, and wherein said schedule editing processor means first refers to said product classification file to thereby determine whether or not information on a product input by an operator exists in said work procedure.

3. A schedule table producing system according to claim 1, wherein said schedule editing processing means shares and calculates a schedule of each work process from the whole period of start and end dates of the whole work process on the basis of the weight of each work process along said sequence of said first relational table in response to the designation of product names of said product table file and the designation of said start and end dates of the whole work process.

4. A schedule table producing system according to claim 1, wherein said schedule editing processing means shares a period from a start date to an end date of the whole work process on the basis of the weight of each work process stored in said work procedure file along said sequence of work processes in said first relational table in response to the designation of products to be produced from said product table stored in said product table file and the designation of said start and end dates of the whole work process for said designated products, calculates start and end dates for each of said work processes, stores said start and end dates for each work process into said process table in said schedule file, determines work sequence of each work process with reference to said first relational table indicating a sequence of each work process, produces a series of schedules and produces a schedule edited into a table form.

5. A schedule table producing method executed by a computer, said method comprising the steps of:

storing product names to be produced in a product table file, each work process having a weight attached thereto in a work table included in a work procedure file wherein said weight represents a ratio of time required for completing the work process and time required for completing a whole sequence of said work processes associated with the product, and a storing sequence of processes in a relational table;

calculating and editing a schedule of each work process from input start and end dates of a whole work process for a product to be produced on the basis of the weight of each work process with reference to said tables of said work procedure file and said product table file to produce an edited schedule of work processes; and producing a process table in which a start date and an end date of each work process are stored, and a relational table in which sequence of processes is stored, based on said edited schedule of work processes.

6. A schedule table producing method according to claim 5, wherein said process table and said relational table in which a sequence of processes is stored are displayed on a display screen to enable an operator to modify said tables interactively on said screen.

7. A schedule table producing method according to claim 5, further comprising a step of storing, into a schedule file, said process table and said relational table in which the sequence of processes is stored.

* * * * *